US012081920B2

(12) United States Patent
Brown et al.

(10) Patent No.: US 12,081,920 B2
(45) Date of Patent: Sep. 3, 2024

(54) SYSTEMS AND METHODS FOR INFRASTRUCTURE CONFIGURATION MANAGEMENT

(71) Applicant: CommScope Technologies LLC, Hickory, NC (US)

(72) Inventors: Malcolm Graham Brown, Flintshire (GB); David Nicholas Atkinson, Colwyn Bay (GB); Thomas Eastham, Prestatyn (GB); Ryan E. Enge, Carrollton, TX (US)

(73) Assignee: CommScope Technologies LLC, Claremont, NC (US)

( * ) Notice: Subject to any disclaimer, the term of this patent is extended or adjusted under 35 U.S.C. 154(b) by 107 days.

(21) Appl. No.: 17/998,230

(22) PCT Filed: Apr. 8, 2021

(86) PCT No.: PCT/US2021/026369
§ 371 (c)(1),
(2) Date: Nov. 8, 2022

(87) PCT Pub. No.: WO2021/225737
PCT Pub. Date: Nov. 11, 2021

(65) Prior Publication Data
US 2023/0217139 A1     Jul. 6, 2023

Related U.S. Application Data

(60) Provisional application No. 63/021,846, filed on May 8, 2020.

(51) Int. Cl.
*H04Q 1/02*     (2006.01)
(52) U.S. Cl.
CPC ................... *H04Q 1/133* (2013.01)

(58) Field of Classification Search
CPC . H04Q 1/133; H04Q 1/06; H04Q 1/13; H04L 12/66; H04L 49/30
See application file for complete search history.

(56) References Cited

U.S. PATENT DOCUMENTS

| 6,658,191 | B2 | 12/2003 | German et al. |
| 7,038,135 | B1 * | 5/2006 | Chan .................... H01R 31/065 |
| | | | 174/84 R |

(Continued)

FOREIGN PATENT DOCUMENTS

| CN | 101047514 A | 10/2007 |
| CN | 101119507 A | 2/2008 |

(Continued)

OTHER PUBLICATIONS

International Searching Authority, "International Search Report and Written Opinion from PCT Application No. PCT/US2021/026369" Jul. 28, 2021, pp. 1 through 9, Published in: KR.

(Continued)

*Primary Examiner* — An T Nguyen
(74) *Attorney, Agent, or Firm* — Fogg & Powers LLC

(57) ABSTRACT

In one embodiment, a system for providing port occupancy management for a network connected device that includes a plurality of ports comprises: at least one port status input panel that comprises a plurality of manually operable port occupancy status selector switches, wherein each of the selector switches are associated with one or more of the ports; a control circuit coupled to the port status input panel, wherein the control circuit determines a port occupancy status for each of the ports based on signals initiated by the selector switches; a gateway coupled to the control circuit and configured to aggregate port occupancy status data for the network connected device based on the port occupancy status for each of the ports determined by the control circuit.

(Continued)

The gateway executes at least one interface configured to provide the port occupancy status data to a remote system.

25 Claims, 8 Drawing Sheets

(56) References Cited

U.S. PATENT DOCUMENTS

| | | |
|---|---|---|
| 8,994,547 B2 | 3/2015 | German |
| 9,913,010 B2 | 3/2018 | Ma et al. |
| 10,764,324 B2 | 9/2020 | Chang et al. |
| 2002/0010518 A1 | 1/2002 | Reid et al. |
| 2009/0096581 A1* | 4/2009 | Macauley ............... H04Q 1/138 |
| | | 340/572.7 |
| 2011/0008996 A1* | 1/2011 | Pinn ....................... H04Q 1/136 |
| | | 439/489 |
| 2013/0128758 A1* | 5/2013 | Polland ............... H04L 43/0811 |
| | | 370/252 |
| 2018/0077778 A1 | 3/2018 | Vangeel et al. |
| 2019/0286211 A1* | 9/2019 | Polland .................. H04Q 1/136 |
| 2021/0084390 A1 | 3/2021 | German et al. |

FOREIGN PATENT DOCUMENTS

| | | |
|---|---|---|
| CN | 104160657 A | 11/2014 |
| CN | 104735047 A | 6/2015 |
| EP | 1771015 A2 | 4/2007 |
| EP | 2294830 A1 | 3/2011 |

OTHER PUBLICATIONS

China National Intellectual Property Administration, "Notification of the First Office Action", dated May 14, 2024, from CN Application No. 202180031233.6, from Foreign Counterpart to U.S. Appl. No. 17/998,230, pp. 1 through 11, Published: CN.

European Patent Office, "Extended European Search Report", dated May 28, 2024, from EP Application No. 21800297.4, from Foreign Counterpart to U.S. Appl. No. 17/998,230, pp. 1 through 8, Published: EP.

* cited by examiner

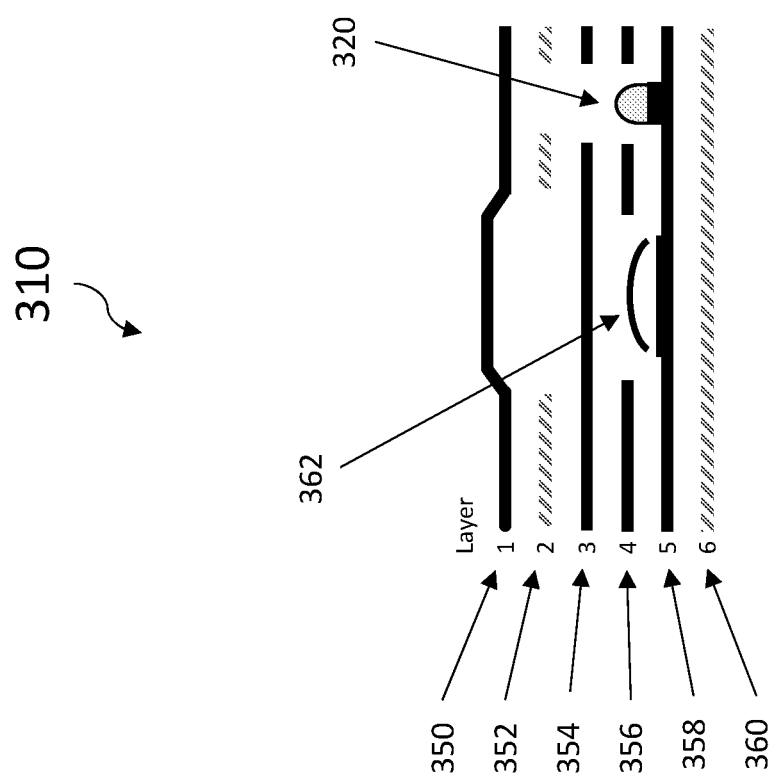

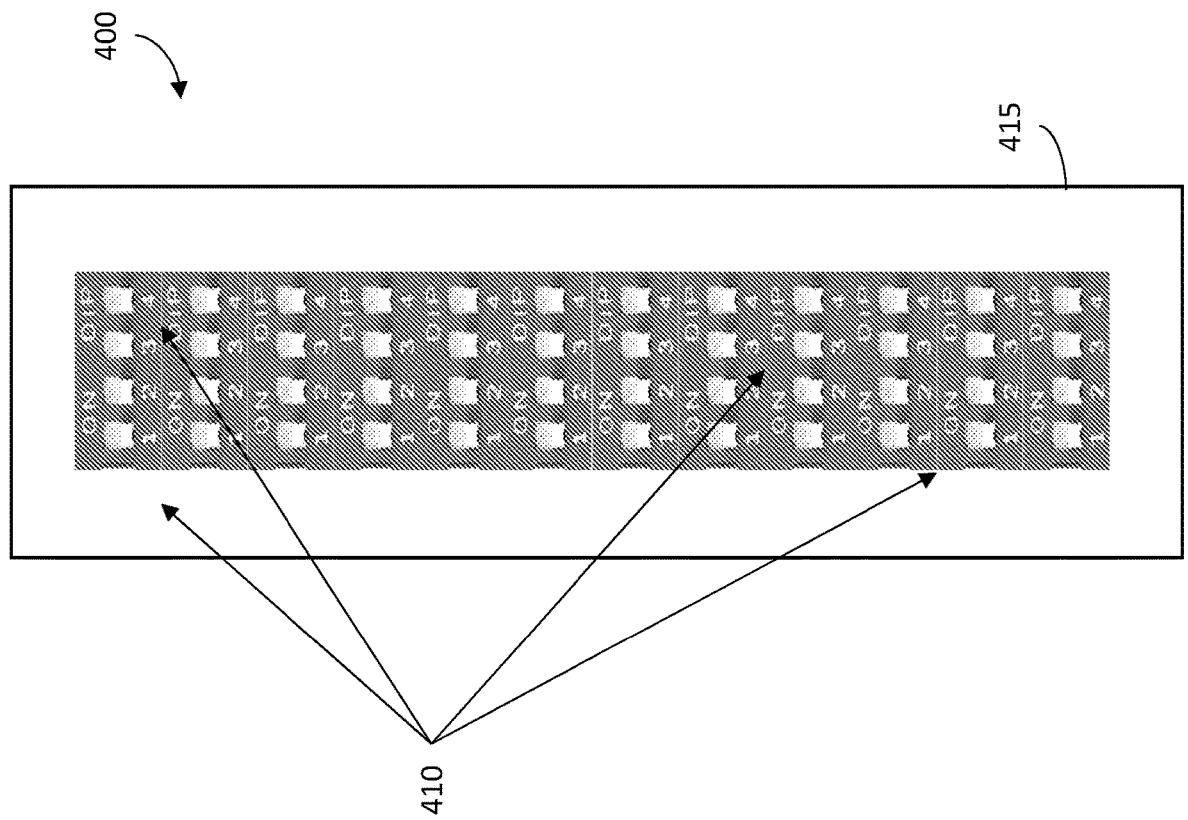

SYSTEMS AND METHODS FOR INFRASTRUCTURE CONFIGURATION MANAGEMENT

CROSS-REFERENCE TO RELATED APPLICATIONS

This patent application claims priority to, and the benefit of, International Patent Application No. PCT/US2021/026369, titled "SYSTEMS AND METHODS FOR INFRASTRUCTURE CONFIGURATION MANAGEMENT" filed on Apr. 8, 2021, claiming priority to, and the benefit of, U.S. Provisional Patent Application No. 63/021,846, titled "SYSTEMS AND METHODS FOR INFRASTRUCTURE CONFIGURATION MANAGEMENT" filed on May 8, 2020, which are incorporated herein by reference in their entirety.

BACKGROUND

Telecommunications and cable companies use patching systems in strategic locations to easily connect and disconnect services without having to go into the actual equipment locations. A patching system may be used in connection with data center environments, providing interconnection between servers, switches, storage devices, and other data center equipment, as well as home and office/LAN environments. In a telecommunication system, a patching system is typically used to interconnect the various telecommunication lines. A patching system may include a mounting frame that has one or more racks. A typical location of the patching system is within a telecommunications closet, server room, or data center.

A rack typically includes a plurality of patch panels. Further each patch panel typically includes a plurality of communication ports. Each communication port is connected to a fixed communication line. These fixed connections can be made using punch-down blocks (in the case of copper communication media) and fiber adapters, fiber splice points, and fiber termination points (in the case of fiber communication media). Accordingly, each fixed communication line is terminated at a select communication port on a patch panel in an organized manner. In small patch systems, all communication lines may terminate on the patch panels of the same rack. In larger patch systems, multiple racks may be used, wherein different communication lines terminate on different racks.

Each port is also configured to attach a second cable typically referred to as a patch cable or patch cord. Each port includes a suitable female connector, adapter, or jack that mates with the corresponding male connector on the end of the patch cord. The connection between the patch cord connector and the port connector is designed to facilitate the easy and repeated attachment and un-attachment of the patch cord to the port. Examples of cables include CAT-5, 6, and 7 twisted-pair cables having modular connectors or plugs attached to both ends (in which case, the patch cords include compatible modular jacks) or fiber cables having SC, LC, FC, LX.5, MTP, or MPO connectors (in which case, the patch cords include compatible SC, LC, FC, LX.5, MTP, or MPO connectors or adapters). Other types of connectors including, for example, BNC connectors, F connectors, DSX jacks and plugs, bantam jacks and plugs, and MPO and MTP multi-fiber connectors and adapters may also be used.

Interconnections between the various communication lines are made using patch cords. Both ends of each patch cord are typically terminated with patch cord connectors. In use, one end of a patch cord is selectively connected to a first select port associated with a first communication line and the opposite end of the patch cord is selectively connected to second port that is associated with a second communications line. By selectively connecting the various lines with patch cords, any combination of communication lines can be interconnected.

For many legacy patching system, the tracking of the connections configuration of the system a manual process where a technician who makes a cable connection or disconnection at one or more ports at the patch panel, informs another technician at a management system of the connection or disconnection events. The technician at the management system at the remote network then manually enters the information to configure the system to accommodate the changes. While modern patching systems now typically include infrastructure management (IM) technologies that automate the tracking of the connections, there are challenges to bringing that functionality to legacy patching systems that may lack the corresponding sensors, processors, power resources, and/or physical space needed. Moreover, to retrofit the patching system equipment, the network operator would either need to schedule a service and/or equipment outage so that the work can be performed, or run the risk of attempting to modify the legacy equipment while it remains in service, actively carrying traffic.

SUMMARY

A system for providing port occupancy management for a network connected device that includes a plurality of ports, the system comprising: at least one port status input panel, wherein the at least one port status input panel comprises a plurality of manually operable port occupancy status selector switches, wherein each of the plurality of manually operable port occupancy status selector switches are associated with one or more ports of the plurality of ports of the network connected device; a control circuit coupled to the at least one port status input panel via a flexible cable, wherein the control circuit determines a port occupancy status for each of the plurality of ports based on signals initiated by the manually operable port occupancy status selector switches; and a gateway configured to couple to a network, wherein the gateway is coupled to the control circuit and configured to aggregate port occupancy status data for the network connected device based on the port occupancy status for each of the plurality of ports determined by the control circuit, wherein the gateway executes at least one interface configured to provide the port occupancy status data to a remote system via the network in response to a request received via the network.

DRAWINGS

Figures 3, 3A:
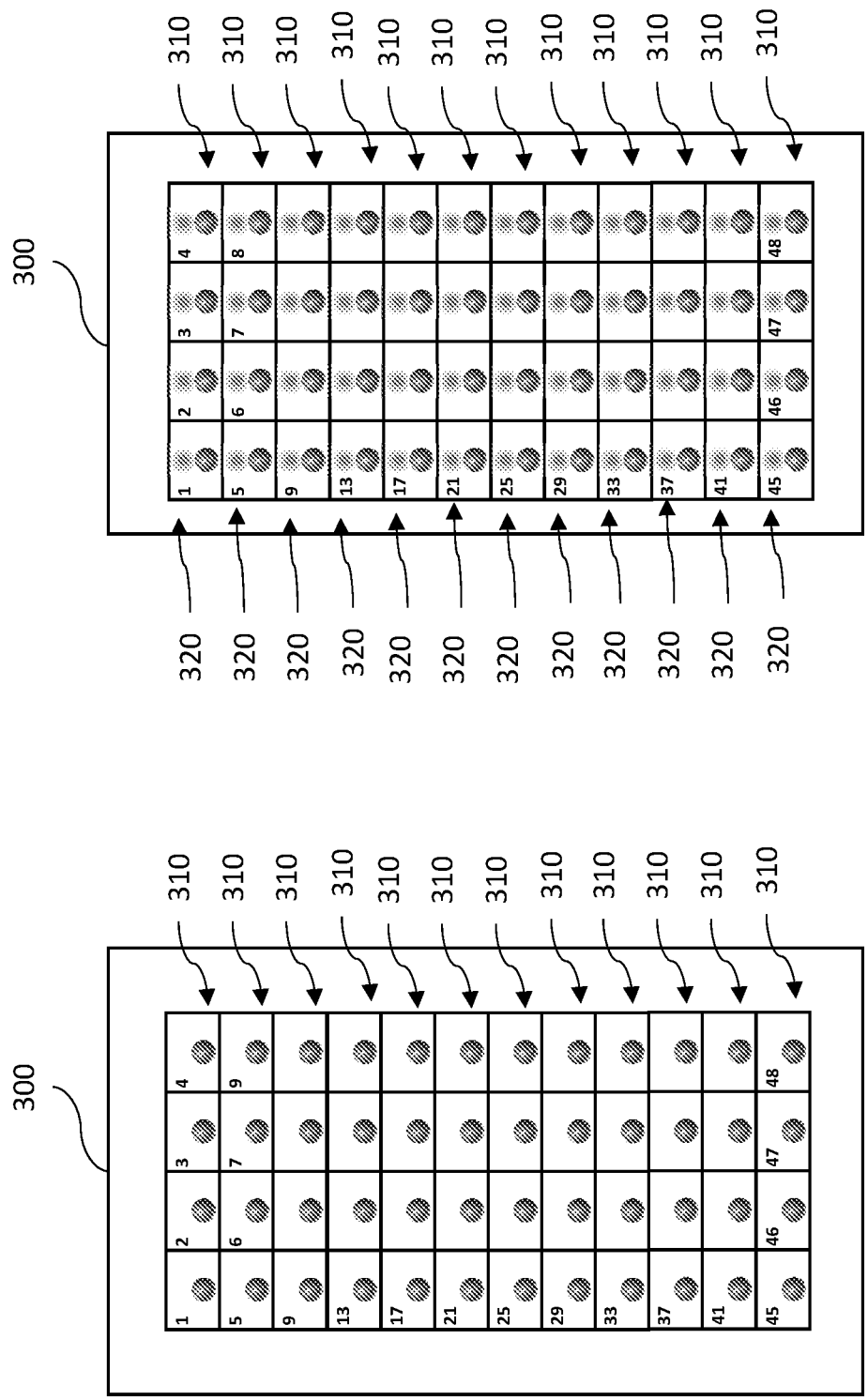

FIGS. 3, 3A, and 3B are diagrams illustrating an example port status input panel embodiment with membrane switching elements.

FIG. 4 is a diagram illustrating an example port status input panel embodiment with mechanical sliding switch elements.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure may be used to retrofit a network connected device (such as patching equipment, network servers, network switches, network routers, and the like) to include port status input panels that provide technicians with an electronic interface that they may utilize to manually enter port occupancy status information and/or ascertain the port occupancy status for any port of the network connected device. Retrofitting existing network connected devices can be difficult at least partially because the devices are in-service and carrying communications traffic. Disconnecting or damaging patch cords during an equipment retrofit modification can therefore interrupt service. In contrast, some of the embodiments of the port status input panels discussed herein may be installed within the network connected device in locations away from the ports with patch cord connections. As discussed below, the port occupancy status information entered into the port status input panels may be locally collected and aggregated, and made available to remote infrastructure management systems and databases so that the information entered locally at the device can be utilized to maintain current information regarding a network's connectivity configuration.

Figure 1:
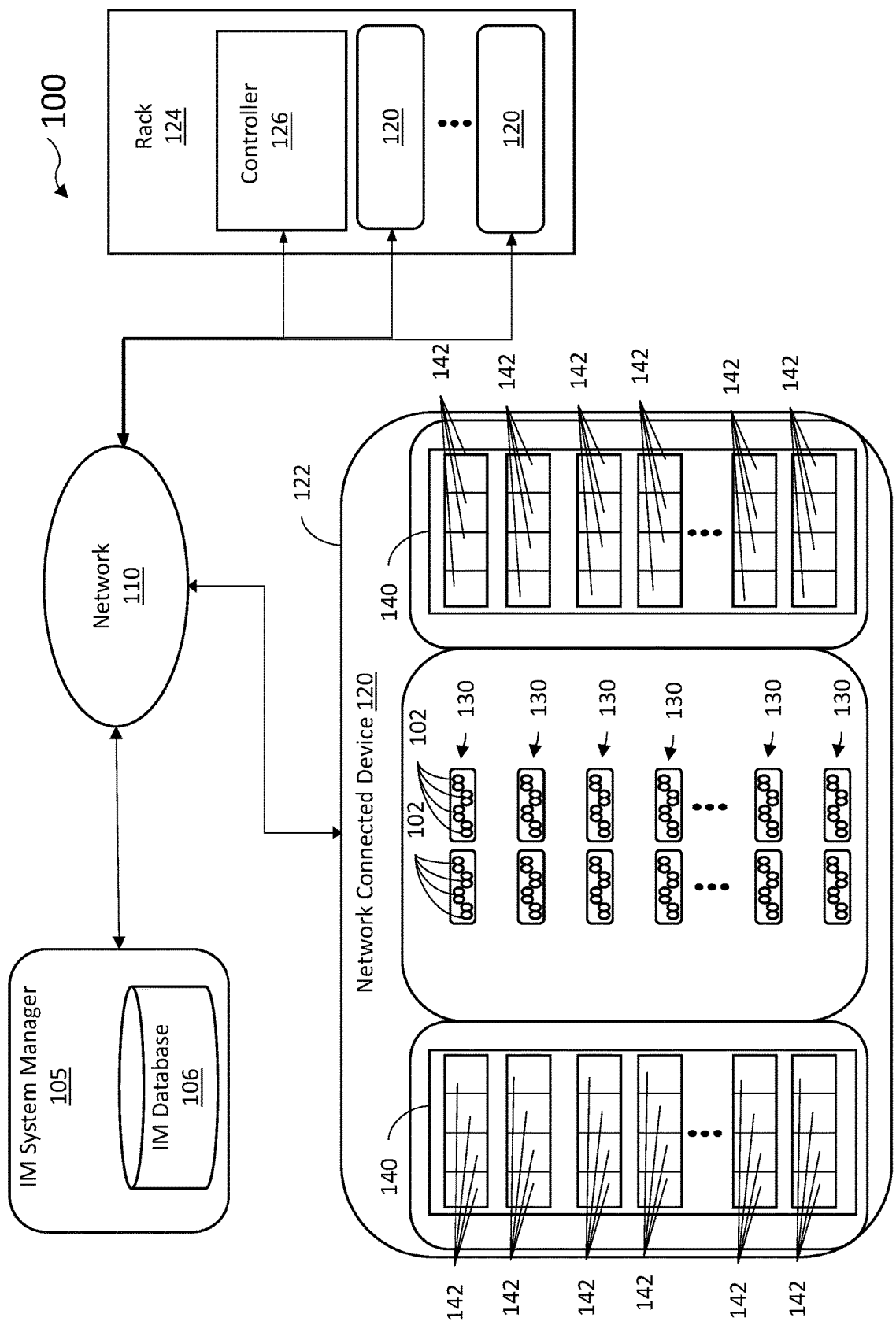
FIG. 1 is a block diagram illustrating an example infrastructure management system embodiment.

FIG. 1 is a block diagram of one exemplary embodiment of an infrastructure management (IM) system 100 that is configured to track connections made using items of network connected devices 120. The connections can be made with various types of cabling, including, without limitation, copper cables and fiber optic cables. The system 100 shown in FIG. 1 can be implemented, for example, in a data center or enterprise application. Other embodiments can be implemented in other ways (for example, where the system 100 is implemented in a central office or other facility of a telecommunication service provider and/or in another part of the telecommunication service provider's network). In the example embodiments illustrated in FIG. 1, the network connected device 120 comprises an item of patching equipment, such as a patch panel. However, it should be understood that other implementations are contemplated so that a "network connected device" as the term is discussed herein may comprise, any type of device used within a network such as, but not limited to, patching equipment (for example, patch panels), servers, switches, routers, and the like.

Each network connected device 120 includes a plurality of connection points or ports which can be generally referenced as a "port 102" or "ports 102." Each port 102 may be connected to a fixed communication line. Each port 102 is also configured to be selectively coupled to a patch cord connector of a patch cord (not shown). That is, each port 102 is configured to be selectively physically connected to a patch cord connector that is part of a patch cord. For example, each port 102 may include a suitable female connector, adapter, or jack that mates with the corresponding male connector on the end of the patch cord. The connection between the patch cord connector and the port 102 is designed to facilitate the easy and repeated attachment and un-attachment of the patch cord to the port 102.

In some embodiments, the ports 102 of each network connected device 120 may be comprised within at least one port module 130. In some embodiments, a port module 130 comprises a modular plate or fixture that may be installed into predefined locations (which may be identified by slot numbers and/or slot position) within the network connected device 120. Each of the port modules 130 shown in FIG. 1 comprises a plurality of ports 102 into which network cables may be coupled. However, it should be understood that in alternate implementations of any of the embodiments described herein, a specific port module 130 may instead comprise any number of ports including a single network port 102.

For the particular example illustrated in FIG. 1, each port module 130 comprises duplex Lucent Connector (LC) ports that facilitate fiber optic network data cable connections to the network connected device 120. In various other embodiments, the ports 102 may compatible with other single-fiber, or multi-fiber, optical fiber connector formats such as Standard Connector (SC), multiple-fiber push-on/pull-off (MPO/MTP) connectors, or other connectors suitable for connecting to optical fibers known to one having skill in the art. In still other embodiments, the ports 102 may couple with network data cables comprising electrical conductors such as, but not limited to, coaxial cable, Category (CAT) 5, CAT 6A, CAT 7, CAT 8, or other cable that is able to function as a physical medium for the transmission of data. In some embodiments, network data cables coupled to the ports 102 may comprise hybrid cables that include both optical fibers and electrical conductors. It also should be understood that the network connected device 120 discussed herein, may comprise any type of device used by a network such as, but not limited to patching equipment (for example, patch panels) as well as servers, switches, routers, and the like. It should also be understood that in some embodiments, the ports 102 of a network connected devices 120 may each be designed to facilitate duplex fiber connections. That is, a single port 102 accommodates two separate fiber connectors that together define a single patch cord.

The network connected devices 120 may be housed within a chassis 122 and may be optionally deployed in racks 124 along with a rack controller 125 and other items of equipment (not shown) (such as servers, routers, and switches). In other embodiments, the network connected devices 120 may be freestanding or otherwise not installed as part of a rack 124. In some embodiments, the network connected devices 120 may be referred to as a fiber shelf or cable shelf or drawer.

System 100 is a managed system in the sense that changes to connections of each of the ports 102 to respective cables is monitored and reported back to a server or other network system such as an IM system manager 105 via network 110. In one aspect, the IM system manager 105 is configured to compile asset and connection information and to provide an end-to-end trace of connections. The IM system manager 105 stores the asset and connection information in an IM database 106. The IM system manager 105 and IM database 106 can be implemented using one or more computers on which appropriate software is executed. In some embodiments, the IM system manager 105 may receive port occupancy information about the network connected devices 120, without the need for knowledge that the port occupancy information was manually entered by a technician rather than detected by sensors. That is, with embodiments of the present disclosure, the IM system manager 105 may process all the port occupancy information it receives from various sources in the same manner and update its database 106 accordingly. Moreover, the IM system manager 105 itself need not be tied to a specific vendor or infrastructure management technology in order to collect or otherwise utilize port connection information from the network connected devices 120 in the ways described herein.

More specifically, the system 100 is configured to track connections made at the ports 102 of the network connected device 120 based on the status of ports as locally entered by a technician using at least one local port status input panel 140. For the embodiment shown in FIG. 1, the network connected device 120 includes two port status input panels 140. Each port status input panel 140 includes one or more manually operable port occupancy status selector switches 142 each associated with a specific one of the ports 102. The occupancy status of a particular port 102 (i.e., whether "occupied" by a cable connector or "vacant") may accordingly be locally entered into the port status input panel 140 by a technician by toggling the port occupancy status selector switch 142 for that port 102 to correspond to the occupancy status of the port. As discussed above, the ports 102 may optionally be configured as single connector or multi-connector ports. For example, each port 102 may be configured to accept a single-fiber connector, accept a multi-fiber connector, or to accept multiple single-fiber connectors. It should therefore be understood that a single port occupancy status selector switch 142 may be utilized to represent the occupancy status of a port 102 that accepts one or more connectors. In yet other embodiments, a single port occupancy status selector switch 142 may be utilized to represent the occupancy status of a set or grouping that includes one or more of the plurality of ports 102.

For example, a technician may have a work order to add a new patch cable into port 1 and remove an existing patch cable from port 2. After installing the new patch cable into port 1, the technician would manually operate the port occupancy status selector switch 142 associated with port 1 to a switch state corresponding to "occupied". After removing the existing patch cable from port 2, the technician would manually operate the port occupancy status selector switch 142 associated with port 2 to a switch state corresponding to "vacant". Alternatively, a patch cable installation event can be considered to have occurred when the port occupancy status selector switch 142 associated with a port 102 that was previously in a "vacant" state (that is, a state in which no cable is connected to the associated port 102) is operated. Likewise, a patch cable removal event can be considered to have occurred when the port occupancy status selector switch 142 associated with a port 102 that was previously in the "occupied" state is operated.

As further detailed below, based on the inputs entered into the port status input panel 140, the IM System Manager 105 can determine whether specific ports 102 are occupied or vacant. In some embodiments, the IM database 106 stores port occupancy information for each of the ports 102 and/or tracks the occurrence of port occupancy changes entered into the port status input panel 140. By accessing the IM System Manager 105, an operator of system 100 can determine which ports 102 on each of the network connected device 120 is considered 'vacant' or unused, and alternatively which are 'occupied' by a cable that is plugged into the port 102. Knowledge of port state may be used, for example, to determine current capacity utilization and/or plan for resource expansion. In other implementation, the IM System Manager 105 may combine port state information with other information to generate network connectivity maps, or for cable tracing. In some embodiments, the IM System Manager 105 may be accessible to users or applications via the public Internet which may be coupled to network 110 via a gateway 187.

It should be understood that in some embodiments, the IM System Manager 105 collects connectivity information from the port status input panels 140 as disclosed herein, in addition to also collecting connectivity information from panels that include automated infrastructure management (AIM) technologies that automatically detect port status and cable connections. In such embodiments, the database 106 is managed by the IM System Manager 105 to store and manage port occupancy information collected from both sources.

The port status input panels 140 for a network connected device 120 may be mounted on a door, panel, drawer, or other component of the network connected device 120. Ideally it would be mounted to a location that would facilitate the ability of a technician to visually observe whether a port 102 is occupied or vacant, and accurately identify and operate the port occupancy status selector switch 142 for that port 102 accordingly. For example, in FIG. 1, port status input panels 140 and their port occupancy status selector switch 142 have a physical alignment and arrangement that matches that of the physical location of their associated ports 102 within the network connected device 120.

Figure 1A:
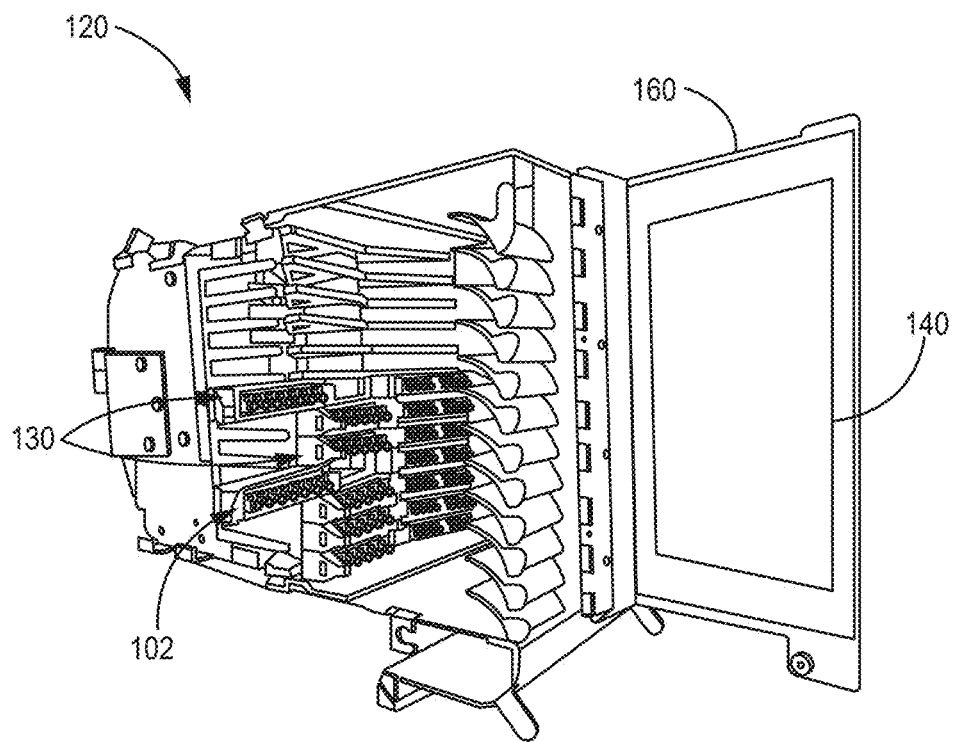
FIGS. 1A and 1B are diagrams illustrating example network connected device embodiments.
Figure 1B:
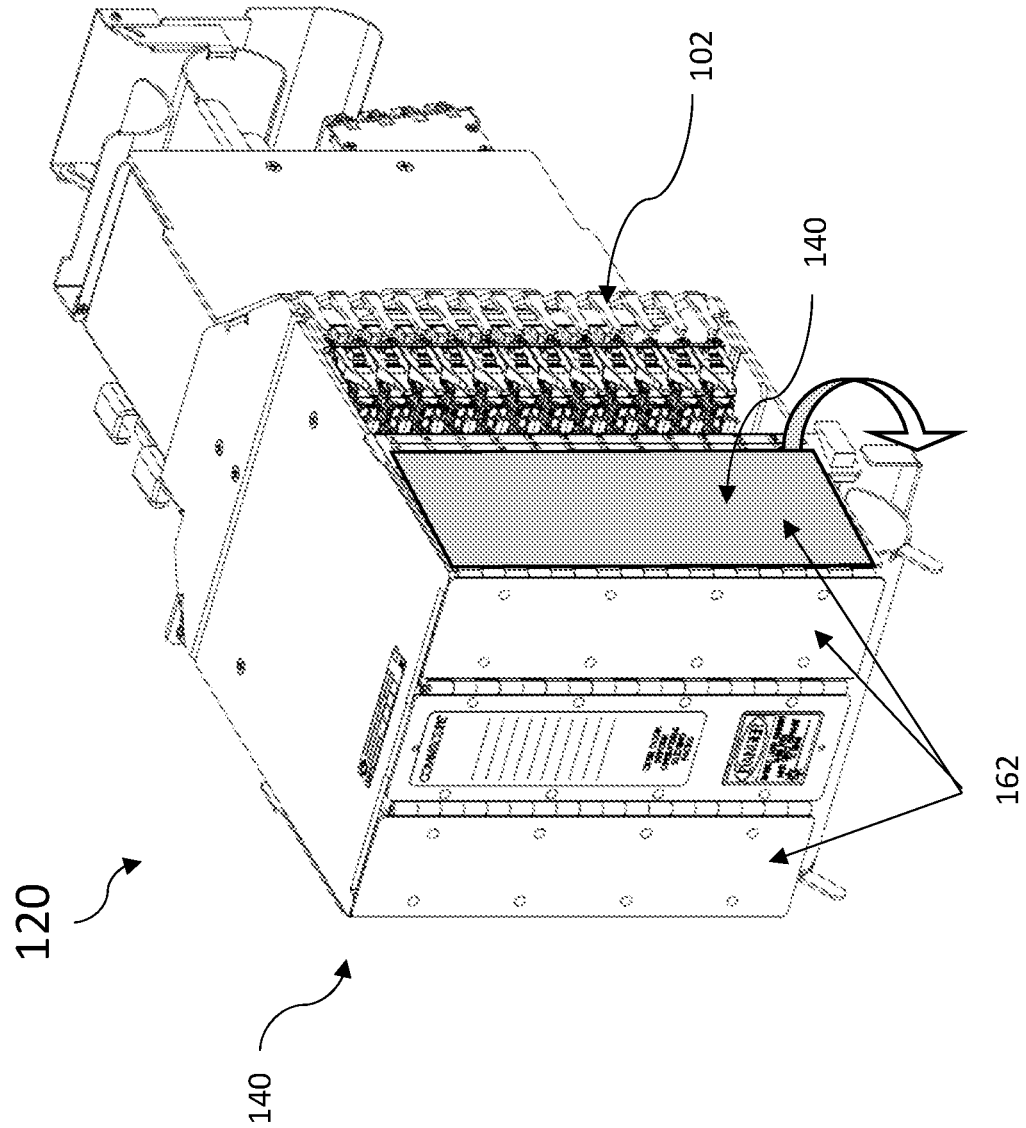

FIG. 1A provides an example embodiment of an example network connected device 120 where a port status input panel 140 is positioned inside a hinged door panel 160. When the door panel is opened, the technician is afforded access to observe the connections made to ports 102 while also viewing and/or operating port occupancy status selector switches 142. FIG. 1B provides an example embodiment of another network connected device 120 comprising a pair of port status input panels 140 positioned on opposing sides of the network connected device 120. In this example embodiment, the port status input panels 140 are each positioned on a respective swinging panel 162 that can be positioned to permit a technician to observe the status connections or portion of the ports 102 while viewing and/or operating port occupancy status selector switches 142. As with the example of FIG. 1, the layout of the port occupancy status selector switches 142 on the door 160, panel 162, or other surface, can be arranged on to mimic the physical layout of the ports 102 as they would be observed locally by the technician.

FIGS. 1A and 1B both illustrate example embodiments where the port status input panels 140 are mounted on the network connected device 120 away from the actual port 102. Such embodiment facilitate installation of the port status input panels 140 while avoiding the need to work in the proximity of ports 102 that might be connected and active. In some embodiments, positioning the port status input panels 140 away from the ports 102 can also permit a technician to quickly observe from the port status input panels 140 port occupancy information without the need to look at the ports 102 directly.

Figure 1C:
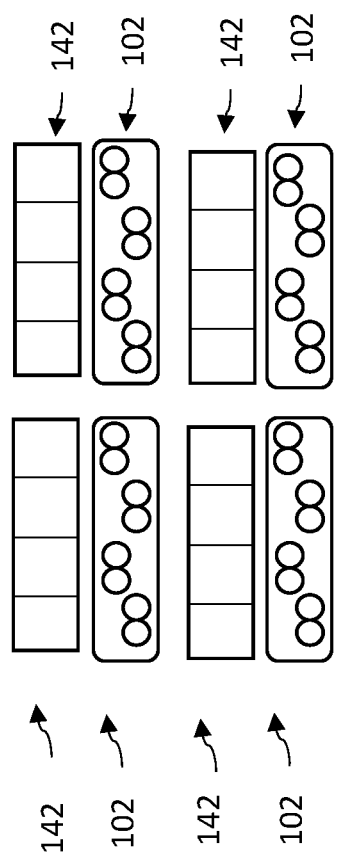
FIG. 1C is a diagram illustrating an example embodiment for an alternate arrangements of port occupancy status selector switches.

In some implementations, there may be benefits to mounting the port status input panels 140 in other ways. In alternate embodiments, the port status input panels 140 may include port occupancy status selector switches 142 positioned in other locations, or in locations distributed on or within the network connected device 120. For example, as shown in FIG. 1C, in some embodiments, the port occupancy status selector switches 142 may instead be distributed such that they are positioned immediately above, below, or next to the ports 102 they are associated with.

Figure 2:
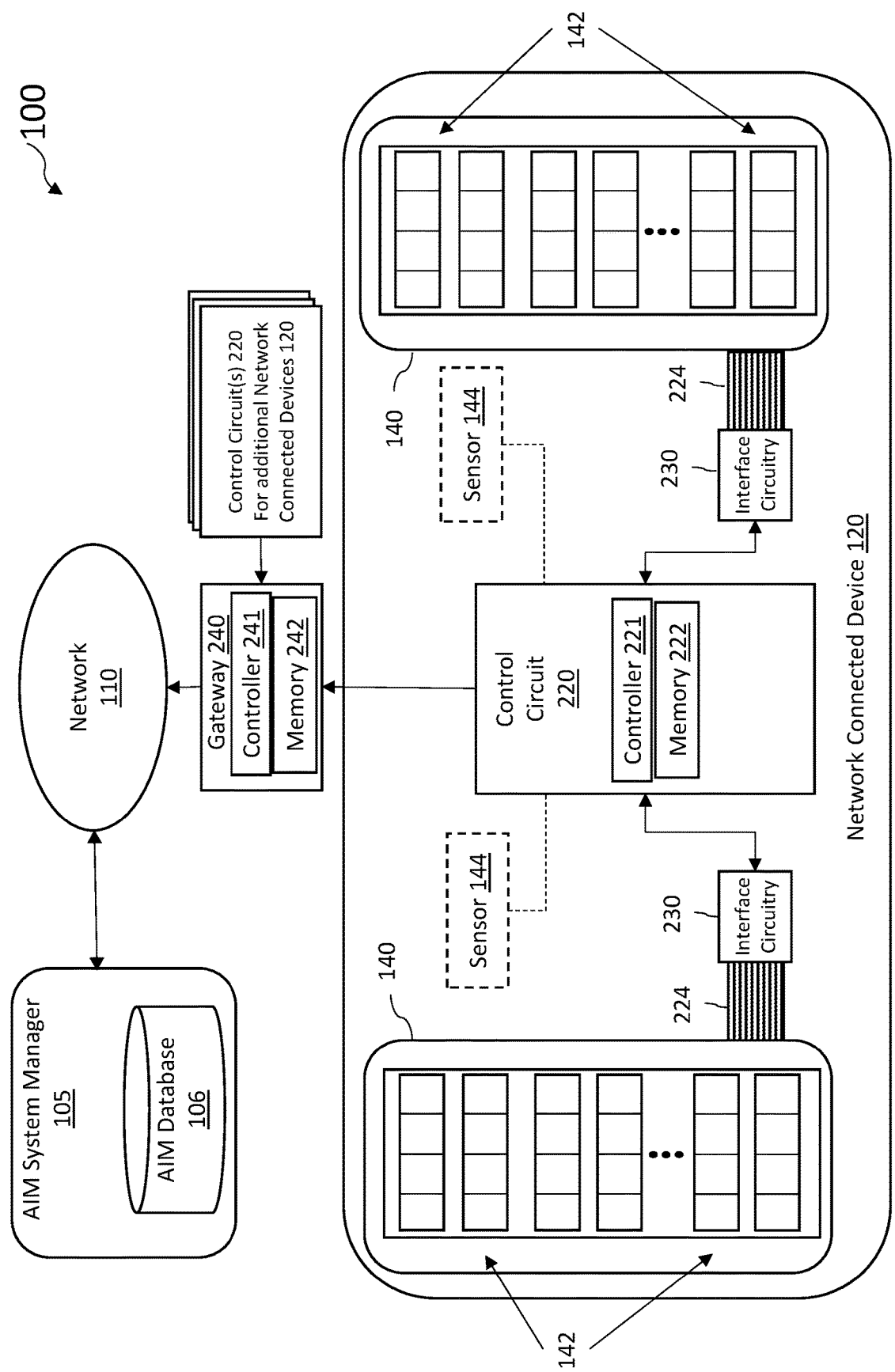
FIG. 2 is a block diagram illustrating an example implementation of port status input panels and port occupancy status selector switches for a network connected device embodiment.

FIG. 2 is a block diagram further illustrating an example implementation of the port status input panels 140 and port occupancy status selector switches 142 for a network connected device 120. In this embodiment, each of the port status input panels 140 for the network connected device 120 are coupled to a control module or circuit 220 within the network connected device 120. The control circuit 220 is in turn coupled to a gateway 240 which is programmed to communicate port 102 connectivity information to the IM system manager 105 via network 110.

In one embodiment, the operation of a port occupancy status selector switch 142 by a technician is designed to initiate the communication of a port occupancy signal to the gateway 240. In alternated embodiments, the port occupancy status selector switches 142 may be designed to latch or as momentary push buttons, mechanical switches, touch sensitive sensors (such as inductive or capacitive sensors) or using other technology. When a port occupancy status selector switch 142 is operated, the control circuit 220 receives a port occupancy signal initiated by the port occupancy status selector switch 142. In some embodiments where the port occupancy status selector switch 142 is a non-momentary two state switch, the port occupancy signal will indicate whether the port occupancy status selector switch 142 is in an "on" (logic 1) or off (logic 0) logic state and translate that state into data indicating whether the associate port 102 is occupied or vacant. For example, a technician may operate the port occupancy status selector switch 142 a state that provides an input to indicate to the control circuit 220 that the associated port 102 is occupied, or to a state to indicates to the control circuit 220 that the associate port 102 is vacant. Alternatively, a port occupancy status selector switch 142 may instead comprise a momentary switch (such as a push-button). In that case, the switch may send a signal to the control circuit 220 when operated that causes the control circuit 220 to toggle the logic state for port 102 between occupied and vacant. That is, if the current logic state is "occupied" when the port occupancy status selector switch 142 is operated, the logic state will toggle to "vacant". Similarly, when the current logic state is a "vacant" then when the port occupancy status selector switch 142 is operated, the logic state will toggle to "occupied".

In some embodiments, a port status input panel 140 may comprise a matrix or array of port occupancy status selector switches 142 arranged in columns and rows. In such embodiments, the port status input panel 140 may comprise circuitry that further outputs the coordinates of the operated with respect to the columns and rows. In some embodiments, the signals from the port occupancy status selector switches 142 may be decoded by an optional interface circuit 230 that may be used to couple the port status input panel 140 to the control circuit 220. In some embodiments the functionality of the interface circuit 230 may be integrated within the control circuit 220 or within the port status input panel 140. In other embodiments, the interface circuit 230 may be omitted. For example, the circuitry of the port status input panel 140 may be coupled directly to the control circuit 220 by a flexible cable.

In the embodiment shown in FIG. 2, the interface circuit 230 is coupled to the port status input panel 140 via a flexible cable 224 (such as a ribbon cable, for example). In some embodiments, the control circuit 220 reads the port occupancy information from the port occupancy status selector switches 142 from the interface circuit 230 and maps that information to port identification codes assigned to each of the ports 102. The control circuit utilizes that information to update and/or maintain in its memory the port occupancy status information for each of the ports 102. In some embodiments, the control circuit 220 assigns a port identification code to each of the ports 102 of the network connected device 120 and controls the value or logic state of a register associated with that port identification code based on the inputs from the port occupancy status selector switch 142 associated with the port 102. Changes to port occupancy status for the ports 102 may then be communicated to the gateway 240 using the port identification codes as changes occur and/or periodically reported to the gateway 240 (for example, in response to polling from the gateway 240).

As previously discussed, in some embodiments the ports 102 are configured as duplex ports designed to accept connections from two fiber connectors of a single patch cord. In such embodiments, a single port status selector switch 142 associated with the port 102 is utilized to indicate the installation or removal of both connectors to the duplex port. In other embodiments, individual port status selector switches 142 may be provided for each separate fiber connector.

In some embodiments, the gateway 240 is in communication with the control circuit 220 and functions as an aggregator of all port occupancy status data. For example, on one embodiment, the gateway 240 comprises a controller 241 and memory 242 to maintain current port occupancy status data for one or more network connected device 120. The gateway 240 provides an interface to that data for other systems, such as to the IM system manager 105 via network 110. In some embodiments, the controller 241 implements an application programming interface (API) which remote systems, such as the IM system manager 105, can access to retrieve port occupancy information for one or more network connected devices 120 from the gateway 240.

A single gateway 240 may aggregate port occupancy status data for a single network connected device 120, or for a plurality of network connected device 120, by communicating with their respective control circuits 220. In some embodiments, a control circuit 220 may communicate with the gateway 240 through a wired connection, or through a wireless connection (for example, using a lower power wireless communication protocol such as Zigbee, Thread and Bluetooth Mesh). In some embodiments, a gateway 240 may be positioned within or at the top of a frame or rack of network connected devices 120 for which it aggregates port occupancy status data for communication to the IM system manager 105. The gateway 240 is configured to communicate port occupancy information to a remote location, such as the IM system manager 105. In some embodiments, the gateway 240 has its own Internet Protocol (IP) address accessible from the network 110. In some embodiments, the gateway 240 may be mounted to or above the chassis 122 of the network connected device 120, or to a frame or rack 124 in which the network connected device 120 is installed.

In general, the control circuit 220 and gateway 240 may include controllers 221, 241, and memory 222, 242 to implement functions of those components described herein. Controllers 221, 241 may comprise of any one or more of a processor, microprocessor, a digital signal processor (DSP), an application specific integrated circuit (ASIC), a field program gate array (FPGA), or equivalent discrete or integrated logic circuitry. In some example embodiments, the controllers may include multiple components, such as any combination of one or more microprocessors, one or more controllers, one or more DSPs, one or more ASICs, one or more FPGAs, as well as other discrete or integrated logic circuitry. The functions attributed to the control circuit 220 and gateway 240 herein may be embodied as software, firmware, hardware or any combination thereof. Any such software or firmware can comprise program instructions that are stored (or otherwise embodied) on or in an appropriate non-transitory storage medium or media, from which at least a portion of the program instructions are read by the associated processor or other programmable device for execution thereby. The memories 222, 242 may further be used for storing port occupancy information as discussed above.

The port status input panels 140 and port occupancy status selector switches 142 may be implemented in various alternate ways. FIG. 3 illustrates at 300 one example of a port status input panel 140 that comprises an array of membrane switching elements 310 for the port occupancy status selector switches 142. In some embodiments, the port status input panel 300 may be installed as an overlay that includes an adhesive backing for mounting the port status input panel 300 to a door or panel of the network connected device 120 as discussed above. In some embodiments, the adhesive backing of the port status input panel 300 may be applied over existing labels that were previously used to document port connections by hand. The port status input panel 300 may include labels next to each of its port occupancy status selector switches 142 indicating the port 102 that each is associated with.

In some embodiments, the port status input panel 300 may further comprise a plurality of optical illuminating devices 320 (such as, but not limited to light emitting diodes (LEDs)), one optical illuminating devices 320 for each of the port occupancy status selector switches 142, so that a technician may more easily determine from the panel whether a port 102 is registered as being occupied with a patch cord installed, or vacant, and/or to verify whether the port occupancy state has been recorded accurately.

For example, the optical illuminating device 320 next to a port occupancy status selector switch 142 may be illuminated to indicate that the associated port is occupied, or not illuminated to indicate that the associated port is vacant. In some embodiments, the illumination of the optical illuminating devices 320 may be controlled by the control circuit 220 to indicate the port occupancy status of that associated port 102 as indicated in the memory 222 of the control circuit 220. In other embodiments, the optical illuminating devices 320 may be used in conjunction with a work order management system to indicate where an action is to be performed. For example, the optical illuminating devices 320 may be controlled to help a technician identify ports 102 involved in a work order in addition to port occupancy. The ports 102 involved in a work order action may be communicated from the work order management system (which may be a component of the IM system manager 105 or a separate system) to the control circuit 220 via network 110 and gateway 240. The control circuit 220 may then control the optical illuminating devices 320 to indicate the associated ports 102 involved in the work order. For example, optical illuminating devices 320 for ports 102 involved in the work order may be controlled to blink in predetermined patterns. In such an embodiment, one blinking pattern may be used to indicate presently occupied ports involved in the work order, and a second blinking pattern may be used to indicate presently vacant ports involved in the work order. The technician's operation of the corresponding port occupancy status selector switch 142 would then communicate to the control circuit 220 that the action for a port 102 was completed, at which point the normal occupancy indications would again be displayed by the optical illuminating device 320 for that port 102.

FIG. 3B illustrates a simplified cut-away side view of an example a port occupancy status selector switch 142 which may be embedded within the layers of a membrane switch port status input panel 300 such as shown in FIG. 3 or 3A. The port occupancy status selector switch 142 may be implemented using a metal dome or other form of depressible mechanical switch 362, or similar switch, which when depressed completes a path of a trace on a circuit layer 358. The circuit layer 358 may also comprise circuitry for implementing any of the various functions of the port status input panel 140 discussed herein.

The optional optical illuminating devices 320 may also be implemented on the circuit layer 358 and controlled by the control circuit 220 via traces on the circuit layer 358. A dome spacer layer 356 provides clearance for the metal dome mechanical switch 362 and optional optical illuminating device 320, and a dome cover layer 354 seals the area comprising the metal dome mechanical switch 362. A graphic layer 350 (which may include printed graphics with port identification information and the like) may be secured to the dome cover layer 354 by a front layer of adhesive 352. The port status input panel 300 itself may be secured to the network connected device 120 by a rear adhesive layer 360. In some embodiments, the dome cover layer 354 and graphic layer 350 may comprise a flexible material (such as a flexible plastic) that deforms when depressed by the technician to operate the embedded metal dome mechanical switch 362. FIG. 3B provides just one example implementation of a port occupancy status selector switch 142. In other embodiments, port occupancy status selector switches 142 may be implemented in other ways.

While the inclusion of using illuminated optical illuminating devices 320 to indicate port occupancy has the advantage of making the port occupancy indication easily observable to a technician in the field, the illumination of optical illuminating devices 320 does require a draw of electrical power. For installations where available power resources are limited, position sensors 144 (such as shown in FIG. 2) may be optionally installed on the network connected device 120 to detect when a port status input panel 140 that comprises LEDs has been moved into an open position, or to otherwise detect when a door or cover of the network connected device 120 has been opened. An example position sensor 144 may include, but is not limited to, a micro-switch or a proximity sensor on the cabinet or swinging panel that is wired back to the control circuit 220. When a technician is actively working in the network connected device 120, the sensor 144 will indicate to the control circuit 220 the open panel, door, lid, etc., and the control circuit 220 will enable illumination of the optical illuminating device to provide visible port occupancy status indications. Conversely, which the panel, door, lid, etc., is closed, the sensor 144 will indicate this to the control circuit 220, and the control circuit 220 will disable the illumination of the optical illuminating devices in order to conserve power. In other embodiments, conserving power may be implemented by having the control circuit 220 configured to place the optical illuminating devices 320 into "sleep" and "wake" modes. That is, enabling the illumination of the optical illuminating devices 320 may be initiated by a first press (for example) of a port occupancy status selector switch 142, which is interpreted as a "wake up" input rather than a port occupancy change input. The control circuit 220 would then energize the optical illuminating devices 320 as appropriate to indicate port occupancy status as described above. The illuminated optical illuminating devices 320 are then illuminated for a period of time (for example, until a time out period expires) at which point the control circuit 220 subsequently disables the illumination of the optical illuminating devices 320 in order to conserve power.

FIG. 4 illustrates at 300 one example of a port status input panel 140 that comprises an array of mechanical switch elements 410 for the port occupancy status selector switches 142. In some embodiments, mechanical switch elements 410 are coupled to a printed circuit board (PCB) 415 which may also comprise circuitry for implementing any of the various functions of the port status input panel 140 discussed herein. In some embodiments, the PCB 415 comprises a thin, flexible PCB such as, but not limited to, a FR-4 PCB. The port status input panel 400 may be installed as an overlay that includes an adhesive backing for mounting the port status input panel 400 to a door or panel of the network connected device 120 as discussed above. In some embodiments, the adhesive backing of the port status input panel 400 may be applied over existing labels that were previously used to document port connections by hand. The port status input panel 400 may include labels on or next to each of its mechanical switch elements 410 indicating the port 102 that each is associated with. In some embodiments, the mechanical switch elements 410 may comprise sliding switch devices or dual in-line package (DIP) switches, where the position of each individual switch provides the input to the control circuit 220 indicating the port occupancy of the associated port 102. For example, operating a mechanical switch element 410 to an "on" position may indicate that the associate port 102 is occupied, and operating a mechanical switch element 410 to an "off" position may indicate that the associate port 102 is vacant. The utilization of mechanical two state switches such as shown in FIG. 4 has the advantage that the use of power consuming visual indicators, such as LEDs, can be avoided. The technician can observe the physical state of the mechanical switch element 410 and deduce the port occupancy status of a particular port 102 directly from that observation.

The embodiments disclosed herein thus are able to provide manually entered port occupancy information for network connected device 120 to remote infrastructure management systems, such as IM system manger 105. Those remote infrastructure management systems may then interrogate that information and aggregate it with both manually entered and sensed port occupancy information from network devices of different makes and models to remotely monitor the network configuration.

Example Embodiments

Example 1 includes a system for providing port occupancy management for a network connected device that includes a plurality of ports, the system comprising: at least one port status input panel, wherein the at least one port status input panel comprises a plurality of manually operable port occupancy status selector switches, wherein each of the plurality of manually operable port occupancy status selector switches are associated with one or more ports of the plurality of ports of the network connected device; a control circuit coupled to the at least one port status input panel via a flexible cable, wherein the control circuit determines a port occupancy status for each of the plurality of ports based on signals initiated by the manually operable port occupancy status selector switches; and a gateway configured to couple to a network, wherein the gateway is coupled to the control circuit and configured to aggregate port occupancy status data for the network connected device based on the port occupancy status for each of the plurality of ports determined by the control circuit, wherein the gateway executes at least one interface configured to provide the port occupancy status data to a remote system via the network in response to a request received via the network.

Example 2 includes the system of example 1, further comprising: at least one interface circuit coupled to the at least one port status input panel by the flexible cable; wherein the control circuit is coupled to the at least one port status input panel via the at least one interface circuit.

Example 3 includes the system of any of examples 1-2, wherein one or more of the plurality of ports are multi-fiber ports configured to accept a multi-fiber connector.

Example 4 includes the system of any of examples 1-3, wherein the at least one port status input panel is mounted to a structural element of the network connected device that does not include the plurality of ports.

Example 5 includes the system of example 4, wherein the at least one port status input panel is mounted inside a door, cover, or swinging panel of the network connected device.

Example 6 includes the system of any of examples 1-5, wherein the network connected device comprises one of: a patch panel, a network switch, a network router, or a network server.

Example 7 includes the system of any of examples 1-6, wherein the control circuit correlates signals initiated by at least a first of plurality of manually operable port occupancy status selector switch to a respective port identification (ID) for a first port of the plurality of ports, wherein the port occupancy status data includes the port ID and the port occupancy status of the first port.

Example 8 includes the system of any of examples 1-7, wherein the at least one port status input panel further comprises: a plurality of optical illuminating devices, wherein each of the optical illuminating devices is positioned next to a respective one of the plurality of port occupancy status selector switches; wherein the control circuit controls illumination of the optical illuminating devices based on the port occupancy status determined for each of the plurality of ports.

Example 9 includes the system of example 8, further comprising at least one position sensor configured to sense a position of the at least one port status input panel, wherein the control circuit enables or disables illumination of the optical illuminating devices in response to the least one position sensor.

Example 10 includes the system of any of examples 1-9, wherein the at least one port status input panel comprises an array of membrane switching elements that define the port occupancy status selector switches.

Example 11 includes the system example 10, wherein the array of membrane switching elements comprises an adhesive layer, wherein the array of membrane switching elements are mounted a structural element of the network connected device by the adhesive layer.

Example 12 includes the system of example 11, wherein the array of membrane switching elements comprises a flexible material.

Example 13 includes the system of any of examples 11-12, wherein the array of membrane switching elements comprises a labels indicating which port of the plurality of port each switching element of the array of membrane switching elements is associated with.

Example 14 includes the system of any of examples 1-13, wherein the at least one port status input panel comprises an array of mechanical slide switches that define the port occupancy status selector switches.

Example 15 includes the system of example 14, wherein at least one port status input panel further comprises a flexible printed circuit board, wherein the array of mechanical slide switches are mounted to the flexible printed circuit board.

Example 16 includes the system of any of examples 14-15, wherein flexible printed circuit board comprises an adhesive layer, wherein the at least one port status input panel is mounted a structural element of the network connected device by the adhesive layer.

Example 17 includes the system of any of examples 1-16, wherein the plurality of manually operable port occupancy status selector switches are distributed within the network connected device, wherein each of the plurality of manually operable port occupancy status selector switches are positioned adjacent to a respective one of the plurality of ports of the network connected device.

Example 18 includes a method for providing port occupancy management for a network connected device that includes a plurality of ports, the method comprising: monitoring a state of a plurality of manually operable port occupancy status selector switches, wherein each of the manually operable port occupancy status selector switches are associated with one or more ports of the plurality of ports of the network connected device; determining a port occupancy status for each of the plurality of ports based on signals initiated by the manually operable port occupancy status selector switches; aggregating port occupancy status data for the network connected device based on the port occupancy status for each of the plurality of ports determined by the control circuit; and transmitting the port occupancy status data to a remote system via a network in response to a request received via the network.

Example 19 includes the method of example 18, wherein one or more of the plurality of ports are multi-fiber ports configured to accept a multi-fiber connector.

Example 20 includes the method of any of examples 18-19, wherein the manually operable port occupancy status selector switches are integrated in at least one port status input panel that is mounted to a structural element of the network connected device that does not include the plurality of ports.

Example 21 includes the method of example 20, wherein the at least one port status input panel is mounted inside a door, cover, or swinging panel of the network connected device.

Example 22 includes the method of any of examples 20-21, wherein the network connected device comprises one of: a patch panel, a network switch, a network router, or a network server.

Example 23 includes the method of any of examples 20-22, wherein the at least one port status input panel further comprises a plurality of optical illuminating devices, wherein each of the optical illuminating devices is positioned next to a respective one of the plurality of port occupancy status selector switches, the method further comprising: controlling illumination of the optical illuminating devices based on the port occupancy status determined for each of the plurality of ports.

Example 24 includes the method of example 23, the method further comprising: selectively enabling and disabling illumination of the optical illuminating devices in response to at least one position sensor that is configured to sense a position of the at least one port status input panel.

In various alternative embodiments, system and/or device elements, method steps, or example implementations described throughout this disclosure (such as any of the network connected devices, IM system manager, gateways, control circuits, interface circuits, controllers, patching equipment, switches, servers, or sub-parts of any thereof, for example) may be implemented at least in part using one or more computer systems, field programmable gate arrays (FPGAs), or similar devices comprising a processor coupled to a memory and executing code to realize those elements, processes, or example implementations, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as system manager, network, gateway, control circuit, controller, interface circuit, sensor, port status input panel, port occupancy status selector switches, network connected devices, servers, patching equipment, switches, routers, LEDs and sensors, refer to non-generic hardware device elements that would be immediately recognized and understood by those of skill in the art of wireless communications and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system for providing port occupancy management for a network connected device that includes a plurality of ports, the system comprising:
at least one port status input panel, wherein the at least one port status input panel comprises a plurality of manually operable port occupancy status selector switches, wherein each of the plurality of manually operable port occupancy status selector switches are associated with one or more ports of the plurality of ports of the network connected device;
a control circuit coupled to the at least one port status input panel via a flexible cable, wherein the control circuit determines a port occupancy status for each of the plurality of ports based on signals initiated by the manually operable port occupancy status selector switches; and a gateway configured to couple to a network, wherein the gateway is coupled to the control circuit and configured to aggregate port occupancy status data for the network connected device based on the port occupancy status for each of the plurality of ports determined by the control circuit, wherein the gateway executes at least one interface configured to provide the port occupancy status data to a remote system via the network in response to a request received via the network.

2. The system of claim 1, further comprising:

at least one interface circuit coupled to the at least one port status input panel by the flexible cable;

wherein the control circuit is coupled to the at least one port status input panel via the at least one interface circuit.

3. The system of claim 1, wherein one or more of the plurality of ports are multi-fiber ports configured to accept a multi-fiber connector.

4. The system of claim 1, wherein the at least one port status input panel is mounted to a structural element of the network connected device that does not include the plurality of ports.

5. The system of claim 4, wherein the at least one port status input panel is mounted inside a door, cover, or swinging panel of the network connected device.

6. The system of claim 1, wherein the network connected device comprises one of: a patch panel, a network switch, a network router, or a network server.

7. The system of claim 1, wherein the control circuit correlates signals initiated by at least a first of plurality of manually operable port occupancy status selector switch to a respective port identification (ID) for a first port of the plurality of ports, wherein the port occupancy status data includes the port ID and the port occupancy status of the first port.

8. The system of claim 1, wherein the at least one port status input panel further comprises:

a plurality of optical illuminating devices, wherein each of the optical illuminating devices is positioned next to a respective one of the plurality of port occupancy status selector switches;

wherein the control circuit controls illumination of the optical illuminating devices based on the port occupancy status determined for each of the plurality of ports.

9. The system of claim 8, further comprising at least one position sensor configured to sense a position of the at least one port status input panel, wherein the control circuit enables or disables illumination of the optical illuminating devices in response to the least one position sensor.

10. The system of claim 1, wherein the at least one port status input panel comprises an array of membrane switching elements that define the port occupancy status selector switches.

11. The system of claim 10, wherein the array of membrane switching elements comprises an adhesive layer, wherein the array of membrane switching elements are mounted a structural element of the network connected device by the adhesive layer.

12. The system of claim 10, wherein the array of membrane switching elements comprises a flexible material.

13. The system of claim 10, wherein the array of membrane switching elements comprises a labels indicating which port of the plurality of port each switching element of the array of membrane switching elements is associated with.

14. The system of claim 1, wherein the at least one port status input panel comprises an array of mechanical slide switches that define the port occupancy status selector switches.

15. The system of claim 14, wherein at least one port status input panel further comprises a flexible printed circuit board, wherein the array of mechanical slide switches are mounted to the flexible printed circuit board.

16. The system of claim 14, wherein flexible printed circuit board comprises an adhesive layer, wherein the at least one port status input panel is mounted a structural element of the network connected device by the adhesive layer.

17. The system of claim 1, wherein the plurality of manually operable port occupancy status selector switches are distributed within the network connected device, wherein each of the plurality of manually operable port occupancy status selector switches are positioned adjacent to a respective one of the plurality of ports of the network connected device.

18. The system of claim 1, wherein the control circuit toggles the port occupancy status for one or more of the plurality of port in response to the signals initiated by the manually operable port occupancy status selector switches.

19. A method for providing port occupancy management for a network connected device that includes a plurality of ports, the method comprising:

monitoring a state of a plurality of manually operable port occupancy status selector switches, wherein each of the manually operable port occupancy status selector switches are associated with one or more ports of the plurality of ports of the network connected device;

determining a port occupancy status for each of the plurality of ports based on signals initiated by the manually operable port occupancy status selector switches;

aggregating port occupancy status data for the network connected device based on the port occupancy status for each of the plurality of ports determined by the control circuit; and transmitting the port occupancy status data to a remote system via a network in response to a request received via the network.

20. The method of claim 19, wherein one or more of the plurality of ports are multi-fiber ports configured to accept a multi-fiber connector.

21. The method of claim 19, wherein the manually operable port occupancy status selector switches are integrated in at least one port status input panel that is mounted to a structural element of the network connected device that does not include the plurality of ports.

22. The method of claim 21, wherein the at least one port status input panel is mounted inside a door, cover, or swinging panel of the network connected device.

23. The method of claim 21, wherein the network connected device comprises one of: a patch panel, a network switch, a network router, or a network server.

24. The method of claim 21, wherein the at least one port status input panel further comprises a plurality of optical illuminating devices, wherein each of the optical illuminating devices is positioned next to a respective one of the plurality of port occupancy status selector switches, the method further comprising:

controlling illumination of the optical illuminating devices based on the port occupancy status determined for each of the plurality of ports.

25. The method of claim 24, the method further comprising:
selectively enabling and disabling illumination of the optical illuminating devices in response to at least one position sensor that is configured to sense a position of the at least one port status input panel.

\* \* \* \* \*